US009535873B2

(12) United States Patent
Froening

(10) Patent No.: US 9,535,873 B2
(45) Date of Patent: Jan. 3, 2017

(54) SYSTEM, COMPUTER-IMPLEMENTED METHOD AND COMPUTER PROGRAM PRODUCT FOR DIRECT COMMUNICATION BETWEEN HARDWARE ACCELERATORS IN A COMPUTER CLUSTER

(71) Applicant: EXTOLL GMBH, Mannheim (DE)

(72) Inventor: Holger Froening, Mannheim (DE)

(73) Assignee: Extoll GmbH, Mannheim, DE (US)

( * ) Notice: Subject to any disclaimer, the term of this patent is extended or adjusted under 35 U.S.C. 154(b) by 184 days.

(21) Appl. No.: 14/361,290

(22) PCT Filed: Sep. 28, 2012

(86) PCT No.: PCT/EP2012/004077
§ 371 (c)(1),
(2) Date: May 28, 2014

(87) PCT Pub. No.: WO2013/079130
PCT Pub. Date: Jun. 6, 2013

(65) Prior Publication Data
US 2014/0317221 A1 Oct. 23, 2014

(30) Foreign Application Priority Data
Nov. 29, 2011 (DE) .......................... 10 2011 119 693

(51) Int. Cl.
*G06F 15/16* (2006.01)
*G06F 15/167* (2006.01)
*G06F 13/28* (2006.01)

(52) U.S. Cl.
CPC ............. *G06F 15/167* (2013.01); *G06F 13/28* (2013.01)

(58) Field of Classification Search
CPC ................................ G06F 13/28; G06F 15/167
See application file for complete search history.

(56) References Cited

U.S. PATENT DOCUMENTS 5,311,595 A * 5/1994 Bjerrum ............. G06Q 20/3674
705/67
6,310,884 B1 * 10/2001 Odenwald, Jr. ......... H04L 47/33
370/412
(Continued)

FOREIGN PATENT DOCUMENTS

FR 2 953 307 A1 6/2011

OTHER PUBLICATIONS

Duato et al., rCUDA: Reducing the number of gpu-based accelerators in high performance clusters, IEEE, 2010, 978-1-4244-6830-0/10, pp. 224-226.*

(Continued)

*Primary Examiner* — Moustafa M Meky
*Assistant Examiner* — Thorne E Waugh
(74) *Attorney, Agent, or Firm* — Brake Hughes Bellermann LLP

(57) ABSTRACT

Systems, methods and computer program products for direct communication between hardware accelerators in a computer cluster are disclosed. The system for direct communication between hardware accelerators in a computer cluster includes: a first hardware accelerator in a first computer of a computer cluster; and a second hardware accelerator in a second computer of the computer cluster. The first computer and the second computer differ from one another and are designed to be able to communicate remotely via a network, and the first accelerator is designed to request data from the second accelerator and/or to retrieve data by means of a direct memory access to a global address space on the second computer and/or to communicate data to the second computer.

17 Claims, 5 Drawing Sheets

(56) References Cited

U.S. PATENT DOCUMENTS

| | | | | |
|---|---|---|---|---|
| 6,956,579 B1* | 10/2005 | Diard | ............... | G06F 12/0284 |
| | | | | 345/502 |
| 7,274,706 B1* | 9/2007 | Nguyen | ............... | H04L 12/56 |
| | | | | 370/419 |
| 7,619,629 B1* | 11/2009 | Danilak | ............... | G06F 15/167 |
| | | | | 345/502 |
| 2008/0266302 A1* | 10/2008 | Andre | ............... | G06F 13/4234 |
| | | | | 345/519 |
| 2011/0154488 A1* | 6/2011 | Rajan | ............... | H04L 63/123 |
| | | | | 726/22 |
| 2012/0001927 A1* | 1/2012 | Tiggs | ............... | G06T 1/60 |
| | | | | 345/522 |
| 2012/0075319 A1* | 3/2012 | Dally | ............... | G06F 12/0284 |
| | | | | 345/537 |
| 2012/0260005 A1 | 10/2012 | Couvee et al. | | |
| 2013/0057560 A1* | 3/2013 | Chakraborty | ............... | G06F 13/14 |
| | | | | 345/520 |

OTHER PUBLICATIONS

Froning et al., Efficient hardware support for the partitioned global address space, IEEE, 2010, 978-1-4244-6534-7/10, pp. 2-3.*

International Search Report and Written Opinion for International Application No. PCT/EP2012/004077, mailed Jan. 10, 2013, and English translation, 8 pages.

Froening, Holger et al., "Efficient Hardware Support for the Partitioned Global Address Space", Parallel & Distributed Processing, Workshops and PhD Forum, 2010 IEEE International Symposium, Piscataway, NJ, Apr. 19, 2010, 6 pages.

Vetter, Jeffrey S. et al., "Keeneland: Brining Heterogeneous GPU Computing to the Computational Science Community", Computing in Science and Engineering, vol. 13, No. 5, Sep. 1, 2011, 5 pages.

\* cited by examiner

SYSTEM, COMPUTER-IMPLEMENTED METHOD AND COMPUTER PROGRAM PRODUCT FOR DIRECT COMMUNICATION BETWEEN HARDWARD ACCELERATORS IN A COMPUTER CLUSTER

DESCRIPTION

The present invention relates generally to computer clusters. More particularly, the present invention relates to a system, a computer-implemented method and a computer program product for direct communication between hardware accelerators in a computer cluster.

In computers and/or computer clusters, hardware accelerators or accelerators are used for more efficient processing of specific peripherals, e.g. graphics card, sound card, etc. However, usability of such accelerators in a computer cluster can be restricted by lack of direct communication and/or synchronization between accelerators of remote computers in the computer cluster and can thus be inefficient (with regard to time and/or memory space requirement). Accordingly, an achievable increase in performance of the computer cluster can be limited by a communication overhead that arises as a result. Consequently, parallelization for the purpose of increasing performance, memory expansion and/ or error tolerance in the computer cluster may also not be possible or possible only to a limited extent.

In other words, in conventional systems, usability of accelerators in parallel computer environments such as computer clusters, for example, may be restricted owing to lack of support for direct communication and/or synchronization.

Known uses of accelerators for data transmissions between spatially distributed accelerators are handled by the CPUs of the respective computers in a computer cluster, which set up communication paths between the different computers in the computer cluster and instruct the network devices to transmit the data. By way of example, firstly the data are copied from the special memory of an accelerator to the primary memory (also designated as main memory) of the corresponding computer in order then to transmit the data via the network of the computer cluster to a remote primary memory of another computer of the computer cluster. The data are subsequently copied to the special memory of the destination accelerator. Such communication between accelerators of different computers in a computer cluster is designated as indirect communication between accelerators in a computer cluster because the communication proceeds via the respective main memories of the respective computers of the computer cluster which participate in the data communication.

Alternative approaches allow the computers in a computer cluster indeed to have direct reading and/or writing access to the special memory of accelerators, in order to avoid unnecessary temporary copying operations to the primary memory of the respective computers. However, in these approaches, too, data communication between accelerators is performed by threads and/or processes on the respective CPUs. Such communication between remote accelerators of different computers in a computer cluster leads to a considerable overhead, however, which can limit in particular the effectiveness of transmitting relatively small amounts of data, for example between 4 bytes and 128 kbytes. In many applications which can be implemented in a computer cluster, small amounts of data are transmitted for example for accelerator communication and/or for synchronization. Furthermore, the CPU of the respective computers involved is required to actively control the tasks of communication and synchronization and therefore cannot be used or can be used only to a limited extent for other (computation) tasks.

Accordingly, these approaches are also based on indirect communication between hardware accelerators in a computer cluster.

In order furthermore to improve an efficiency in computer clusters, hitherto use has been made of superordinate software entities which are executed on the respective CPU of the computers in the computer cluster. Communication and/or synchronization between the accelerators of the respective computers can be implemented by one or more copying operations regarding requested data. Communication and/or synchronization between the accelerators of the respective computers thus remains only indirect, however. In particular, both incorporation of CPUs of the remote computers and copying operations of requested data during communication and/or synchronization between remote accelerators are associated with high additional costs (with regard to time, memory requirement and/or computering power), with the result that a performance and/or a scalability of a computer cluster are/is restricted.

Accordingly, it is an object of the present invention to provide a system, a computer-implemented method and a computer program product which enable an improved performance and/or scalability of computer clusters.

This object is achieved by means of the subjects of the independent claims. The dependent claims relate to preferred embodiments.

One embodiment provides a system for direct communication between hardware accelerators in a computer cluster, comprising:

a first hardware accelerator in a first computer of a computer cluster; and a second hardware accelerator in a second computer of the computer cluster;

wherein the first computer and the second computer differ from one another and are designed to be able to communicate remotely via a network, and wherein the first accelerator is designed to request data from the second accelerator and/or to retrieve data by means of a direct memory access to a global address space on the second computer and/or to communicate data to the second computer.

Preferably, the first accelerator can be designed to request data from the second accelerator and to retrieve the requested data by means of a direct memory access to a global address space on the second computer.

Direct communication between accelerators is present if all the tasks necessary for the communication operation are carried out by accelerator and network device. In particular, CPU and primary memory are not involved in such direct communication.

The first accelerator (also designated as source accelerator) can thus communicate directly with the second accelerator (also designated as destination accelerator) by means of direct memory access to the global address space of the network by way of a read and/or write operation.

In other words, the data request takes place by means of at least one remote read and/or write operation which is sent from a source accelerator to a destination accelerator via the network of the computer cluster. The communication is direct because only the network interfaces of the respective computers and the global address space of the network are used (and preferably modified). This communication takes place by means of a direct memory access to the global address space of the network. Said global address space is transparent for the accelerators. Accelerators which conceptionally cannot distinguish between global, local, different, and/or remote memories are thus enabled to carry out communication and/or data exchange via arbitrary, remote memories, without the accelerators themselves having to be adapted, since a global address space in the network becomes accessible transparently for accelerators.

The system architecture of a computer cluster comprises two or more computers with one or more accelerators (also designated as ACC) with respective special memories, primary processor (also designated as primary computing units or CPUs) with respective primary memories and a network. The network can comprise one or more network devices which make available corresponding network interfaces. The network interfaces can be adapted for direct communication between the accelerators. Furthermore, it is possible to use switches in the network without restriction, with the result that scalability is provided.

Indirect communication between the (hardware) accelerators is present if, for the operation of communication between the accelerators, more computing and/or memory units than absolutely necessary are included, particularly if a plurality of copying operations are carried out. Direct communication between hardware accelerators is present if only the computing and/or memory units directly necessary for the communication are involved, and particularly if the communication comprises only a single operation of copying data to memory addresses.

A global address space is present if, in a computer cluster composed of a plurality of resources, all of the local address spaces are combined to form a uniform, flat (i.e. without a hierarchy) address space. By using a global address it is thus possible to access both local and remote addresses. The global address space can be defined in respective special memories of the hardware accelerators.

As a result of direct communication of hardware accelerators in a computer cluster in a global address space, that is to say for example with a distributed shared memory for the hardware accelerators, it is possible to obtain an increase in performance of accelerators in a computer cluster, to increase an amount of special memory for accelerators and/or to increase an error tolerance. Consequently, an improved performance and/or scalability of computer clusters can be made possible.

By way of example, a CPU uses the main memory as the primary resource for data, independently of whether said main memory is local or remote as part of a distributed shared memory. One advantage of a hardware accelerator (for example a GPU) is based on the replacement of said main memory by special memory (for example GDDR of a GPU), which has higher bandwidths, but whose capacity is more limited in comparison with the main memory. Hardware accelerators can also access the main memory of a computer and/or of a computer cluster in order to transport data from and to the special memory. However, the processing units of the hardware accelerator can only operate on the special memory, and not on the main memory.

In principle, a global address space allows each computer in a cluster to directly access remote computers via said global address space. This applies to CPUs, for example. For hardware accelerators, access via a global address space is not readily possible since:

(1) CPUs normally keep distributed cache structures coherent, wherein underlying principles of a global cache coherence restrict the scalability of such systems. Hardware accelerators generally do not guarantee any cache coherence whatsoever.

(2) Processing units of CPUs can operate directly on remote memories, that is to say that no further copies are effected. Processing units of the hardware accelerators generally operate only on special memories, that is to say at least one copy is necessary.

(3) CPUs define the central resource in a computer system, whereas hardware accelerators are designed as supplementary devices. If the CPU(s) were removed by rationalization in a computer and/or in a computer cluster, then the network interface of the computer cluster, for example, would have to perform these supplementary tasks of the CPU(s). Such supplementary tasks can comprise, for example, initialization of the system including a global address space.

Consequently, the use of a global address space in a computer cluster, which global address space was designed for CPUs, is not readily possible and is possible only with considerable technical restructuring and/or reconfiguration of process sequences of the computer cluster for hardware accelerators.

Unlike CPUs, accelerators operate extremely thread-parallel, and the maximum performance of the accelerators can be achieved only if all of the threads on an accelerator (e.g. a GPU or a warp) follow a uniform instruction flow. If one or a few threads differ in the instruction flow (branch divergence), then the performance decreases to a fraction. Assuming that threads of an accelerator were able to instruct a network interface with regard to communication, then this could only carry out one or a small number of threads, in any case far fewer than the customary number of threads of an accelerator. This then leads to a considerable dip in performance on account of so-called branch divergence.

In contrast to this and unlike communication between CPUs, global address spaces are made usable for accelerators. In this case, an arbitrary number of threads can access remote resources simultaneously via a network interface. This eliminates the problem of branch divergence in the case of direct communication between accelerators by means of global address spaces.

In other words, if communication between CPUs in a computer cluster is correspondingly used for accelerators, then this would be very inefficient on account of the branch divergence described above. This inefficiency is overcome by the use of global address spaces.

In other words, this makes it possible to set up direct communication paths between spatially distributed accelerators in a computer cluster. Direct communication is defined by the fact that an accelerator in a computer of the computer cluster can autonomously have reading and/or writing access to the special memory of a remote accelerator in a computer of the computer cluster that is different than the aforementioned computer. CPU threads and/or CPU processes are not involved in the communication of the remote accelerators of the computer cluster. Rather, all operations necessary for such direct communication are carried out by the remote accelerators involved and/or a network interface of network devices between the corresponding computers of the computer cluster. For this purpose, (virtual) global address spaces are defined in the network of the computer cluster, which are spanned via the distributed special memories of the respective accelerators.

Such direct communication between accelerators in a computer cluster advantageously enables more efficient communication between the accelerators.

In accordance with one preferred embodiment, the direct communication between the hardware accelerators takes place directly via the network and corresponding network interfaces on the computers in the cluster.

In accordance with one preferred embodiment, no support of computing and/or memory units is necessary for the direct communication between the hardware accelerators.

In accordance with one preferred embodiment, the computing and/or memory units comprise CPUs and/or main memories of the first and second computers.

In accordance with one preferred embodiment, the global address space is transparent, such that the accelerators see no difference between a local memory access (for example to the special memory assigned thereto) and an access to a remote memory (e.g. a special memory of a remote accelerator) in another of the computers of the computer cluster.

Since accelerators fundamentally differ from CPUs technically and in terms of their structure, communication via message-oriented communication and/or via shared memory between accelerators takes place differently than between CPUs in a computer cluster. In particular, an aspect of transparency is not relevant in the case of CPUs. By contrast, accelerators are highly specialized devices, and are obtainable cost-effectively only by virtue of a mass market in the field of computer games. No appreciable volume would arise for the acceleration of calculations. A transparent global address space does not require further specialization of such accelerators for distributed use in a computer cluster.

Since the global address space of the network of the computer cluster is transparent, the direct communication between the accelerators involved is transparent. Transparency here means that an accelerator in a computer cluster does not have to distinguish between different addresses, such that it is not visible to an accelerator whether an address points to local or remote memories (also designated as memory units) and/or whether an address points to main memories, special memories and/or other memories of a computer and/or the network of the computer cluster. Consequently, accelerators such as graphics processors, for example, which are not designed for a distributed use, such as in a computer cluster, for example, by means of this transparency, can operate both on remote memories and on different types of memories (e.g. special memories, primary memories, main memories, etc.). In other words, accelerators which are not provided and/or designed for distributed applications in a computer cluster become usable for computer clusters by means of the use of global address spaces, without the accelerators themselves having to be changed. Moreover, although the accelerator cannot distinguish between local and remote accesses to memory addresses, it is nevertheless possible to make the different access costs visible to a user and/or programmer and thus to carry out locality optimizations. Standard accelerators are thus employed. By way of example, it is possible to use one and/or a plurality of the following graphics cards: EVGA GeForce GT 620, NVidia Tesla K10, NVidia Tesla M2090, NVidia Tesla C2075, NVIDIA GeForce GTX 680, AMD FireStream 9370, AMD FirePro W9000, and/or Matrox M9188, without these themselves having to be modified, for use in the system according to the invention. Only a modification of the network interface is required, such that an area or address space in the special memory of the accelerator for communication via the network can be employed for a direct memory access to the global address space.

By way of example, remote reading and/or writing operations are a transparent extension of the local memory access scheme of the accelerators are. The local consistency model of the accelerators should also be maintained for these operations. The network maintains the order of packets, for example, that is to say that packets (which contain reading or writing operations) should not overtake one another. With regard to the implementation, however, it makes no difference whether the order is maintained in the network and/or whether packets are resorted upon reception in the destination (e.g. destination accelerator) in order to reestablish the original order.

Furthermore, the network can guarantee that packets arrive correctly at the destination. Packet loss should be avoided and the data integrity should be ensured. For this purpose, implementations can have recourse to various techniques, e.g. CRC-based link-level retransmission protocols, corresponding end-to-end protocols and/or forward error correction codes.

In this case, a routing decision can be based on the identification of the destination. Depending on whether the destination network interface can handle the loss of the order in the network (resorting in order to reestablish the original order), routing decisions can also be adaptive. Deterministic routing decisions can guarantee the maintenance of the order in the network and therefore do not require such support. The routing mechanism can be based either on tables or on finite state machines which calculate the possible output ports of the respective switch. Table-based methods are preferred on account of higher flexibility.

In accordance with one preferred embodiment, the global address space is a (preferably shared) partition in a distributed shared memory of the computer cluster.

A partition essentially defines an address area which is assigned a specific resource (e.g. part of the special memory of a specific accelerator). A partition can be defined as shared if more than one local and/or remote resource (e.g. CPU, accelerator, network device, etc.) can access it. In this sense, any global address space can be a partition. However, this partition is not necessarily shared. By way of example, a resource can be accessed by a remote resource via a global address space, in which case a local access of this resource is then not performed via the global address space.

In accordance with one preferred embodiment, the direct memory access to the global address space comprises translating a source address in the special memory of the first accelerator into a global address in the global address space (32), wherein the second accelerator is determined by means of the global address in the global address space.

In accordance with one preferred embodiment, the second accelerator is determined by means of a mask in the global address space.

In accordance with one preferred embodiment, the second accelerator is determined by means of intervals in the global address space.

One embodiment provides a method for direct communication between hardware accelerators in a computer cluster, comprising
  providing a first hardware accelerator in a first computer of a computer cluster; and
  providing a second hardware accelerator in a second computer of the computer cluster;
  wherein the first computer and the second computer differ from one another and are designed to be able to communicate remotely via a network, and
  wherein the first accelerator is designed to request data from the second accelerator and/or to retrieve data by means of a direct memory access to a global address space on the second computer and/or to communicate data to the second computer.

One embodiment provides a computer program product, in particular stored on a computer-readable medium or realized as a signal, which, if loaded into the memory of a computer and executed by a computer, has the effect that the computer is designed to carry out a method according to the invention.

Preferred embodiments are described by way of example below with reference to accompanying drawings. It is noted that even if embodiments are described separately, individual features thereof can be combined to form additional embodiments. In the figures.

Figure 1:
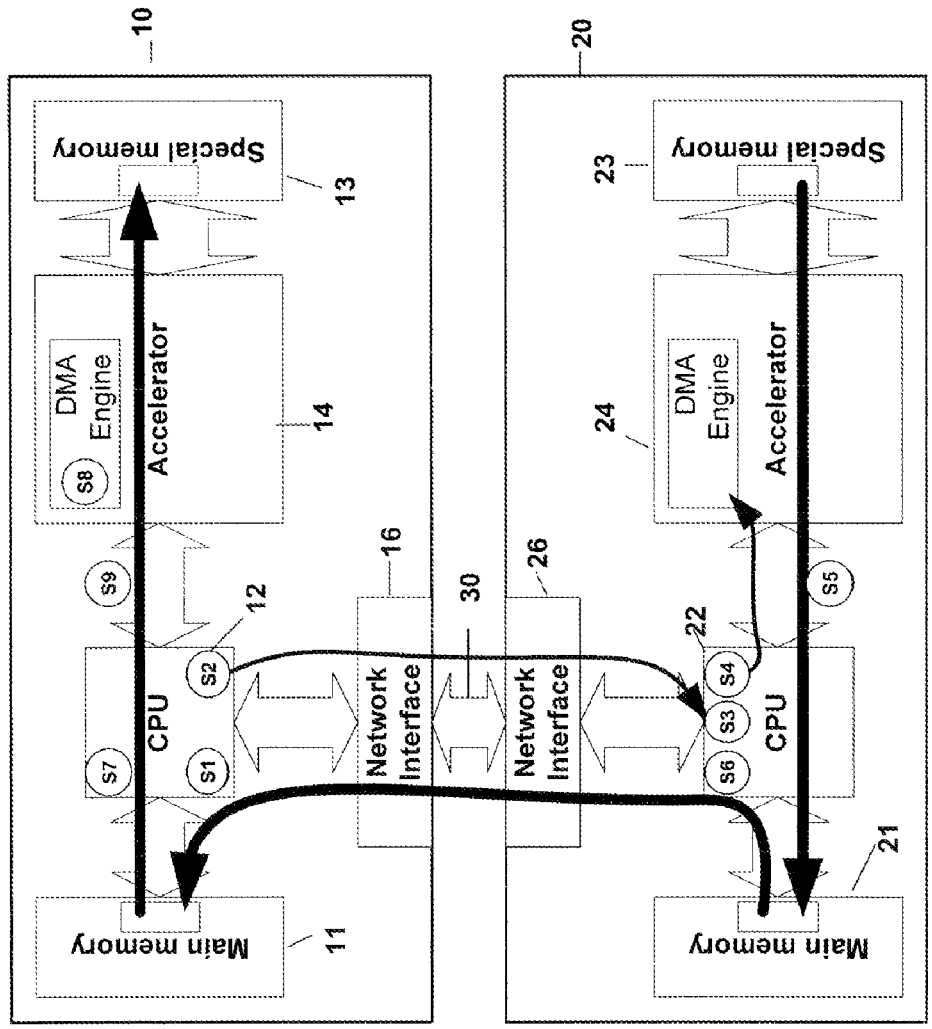
FIG. 1 shows a method for indirect communication between hardware accelerators in a computer cluster.

Some technical terms used hereinafter in the application are introduced below.

(Hardware) Acceleration/(Hardware) Accelerator

Hardware acceleration can generally describe a reduction of the burden of the primary processor (CPU) of a computer by delegation of specific computationally intensive tasks to hardware that is specialized for these tasks, so-called (hardware) accelerators. A CPU is designed such that it can execute arbitrary tasks in a short time. A bandwidth of executable tasks of the CPU may be restricted only by software. However, there may be recurring tasks which cannot be executed very efficiently and rapidly as a result of the general design of the processor architecture of a CPU. The possibilities of optimization are restricted to the software in the case of the CPU.

In order to be able to execute such recurring tasks more efficiently and more rapidly, use is made of specific or specialized hardware components or accelerators which are specialized for these recurring tasks. Since accelerators do not have to be as flexible as a CPU, optimizations in the execution can be taken into account in the hardware architecture of such accelerators. In addition, the computing time of the CPU can then be used for other tasks.

Examples of accelerators which can be used in computers and/or in computer clusters are graphics cards, logic components for decoding mp3 data, encoding and decoding video data, synthesizing audio signals by means of audio accelerators, and/or digital signal processors.

(Computer) Cluster

A computer cluster or cluster generally denotes a number of networked computers which externally can be viewed or addressed as an individual computer. Individual elements and/or computers of a computer cluster can be interconnected via a fast network. A computer cluster can comprise individual, possibly autonomous, computers (which are also called nodes) which can communicate with one another in the cluster via a (connection) network in order in the cluster, for example, jointly to process and/or to solve a task and/or a problem. A computer cluster can be partitioned into one or more subsets, such that in each case only one subset of the computers in the cluster jointly work on a task/problem, to be precise independently of and/or in a manner detached from the other computers in the cluster.

Distributed Shared Memory

In principle, a distributed shared memory can denote a distribution of the main memory of computer clusters in which each computer in the cluster is able to directly access remote memory. In general, a distributed shared memory can refer to a virtual shared memory. In this case, the actual memory can be distributed among one or more different, mutually separated and/or independent physical memories. The distributed shared memory can thus constitute a network layer between user software and hardware.

An architecture with distributed shared memory describes a computer cluster having a physically distributed memory which, however, is addressed via an individual shared logical address space. Since the physical address space can be regarded as distributed, the associated memory is therefore also distributed. By way of example, a connection network can be used to connect a multiplicity of different computing and/or memory units (which can also be designated as resources) in the cluster to form an overall system. Further information is required for path finding from a unit (e.g. a CPU or an input/output device) to a memory unit through the cluster. The logical address space differs from the physical address space in the manner that parts of a logical address are interpreted for identifying a destination (e.g. the memory unit). The identification can include for example an interpretation of this part of the address and/or table-based methods. In any case this is a unique implementation, that is to say one which assigns a unique memory unit to each logical address.

Local and Global Address Space

The address space of a computer in a computer cluster can be divided into local and global addresses and thus into local and global address spaces. Whereas for global addresses no physical address can then be present in the local memory, local addresses point to local memory locations in the local memory. The local memory is therefore divided into a local partition and a shared (that is to say global) partition, but the local partition can have a size of zero. The shared partition then defines the globally addressable address space in the (local) memory. If such a shared partition is distributed in a computer cluster, this is referred to as a distributed shared memory.

FIG. 1 shows conventionally indirect communication between accelerators in a computer cluster. A computer cluster can comprise a multiplicity of computers (also called nodes or servers). FIG. 1 shows an exemplary computer cluster comprising two computers 10, 20. The computers 10, 20 communicate with one another via a network 30. For communication with one another in the computer cluster, each of the computers comprises an interface or a network interface 16, 26. The network interface 16, 26 can be implemented in a corresponding network device (not shown), such as a network card, for example. Furthermore, each of the computers 10, 20 comprises a (primary) processor or a CPU 12, 22. The CPU 12, 22 is connected to the interface 16, 26 and a primary memory or main memory 11, 21. A main memory relates to a memory which comprises the programs and/or program parts that are currently to be executed and the data required therefor. The main memory 11, 21 is a component of the central unit of the computer 10, 20. The CPU 12, 22 can directly access the main memory. Furthermore, each of the computers 10, 20 in the computer cluster comprises at least one accelerator 14, 24 and a respectively assigned special memory 13, 23.

The accelerator 14, 24 can communicate with the CPU 12, 22 and operates on the special memory 13, 23, wherein the special memory 13, 23 is directly linked or coupled to the accelerator 14, 24. Accordingly, the CPUs 12, 22 are required for controlling communication between the accelerators 14, 24.

In one embodiment, a direct memory access is provided for a data transfer between the main memory 11, 21 and the special memory 13, 23. Such a direct memory access is indicated by the thick arrows in FIG. 1. A direct memory access makes it possible that connected peripherals, such as a network card, a graphics card, and/or a sound card, for example, can communicate with the main memory without a detour directly via the CPU, such that faster data transmission is made possible with at the same time a reduction of the burden of the CPU. Additionally or alternatively, for an accelerator 14, 24, the CPU 12, 22 can be designed autonomously, without direct memory access, to be able to access (pre)determined areas of the special memory 13, 23 of the accelerator 14, 24.

Communication between two accelerators 14, 24 of two computers 10, 20 in a computer cluster, as shown in FIG. 1, is described below. Communication between accelerators 14, 24 in the computer cluster can comprise a data transfer from one of the computers 10, 20 to another of the computers 10, 20, and vice versa. The communication can comprise a GET operation in one direction and/or a PUT operation in the other direction.

The communication between the two accelerators 14, 24 as shown in FIG. 1 takes place indirectly, that is to say via further computing and/or memory units (e.g. CPUs, 12, 22 and/or main memories 11, 21).

In step S1, the CPU 12 of one of the computers 10 in the computer cluster allocates memory space in the main memory 11 of the computer 10. The CPU then sends a message to a remote computer 20 via a network 30 in the computer cluster, S2. The message can comprise a request for transmitting data. The CPU 22 of the addressed computer 20 receives the message, S3. If the requested data are not present in the main memory 21 of the computer 20, then the CPU 22 allocates a corresponding memory location in the main memory, S4.

Afterward, the CPU 22 initiates a direct memory access of the requested data from the special memory 23 of the accelerator 24, S5. Additionally, the requested data can be copied from the special memory 23 to the main memory 21. In step S6, the CPU 22 triggers or initiates a remote direct memory access via the network interfaces 26 and 16 to the main memory 11 of the remote computer 10 which sent the request or message. In this case, the network interface 16 supplies the requested data and notifies the CPU 12 of the computer which sent the message. If necessary, after the requested data had been received, the CPU 12 copies data in the main memory 11 from one region to another, S7. Afterward, the CPU 12 initiates a direct memory access to the special memory 13 of the accelerator 14, S8 and transfers the requested data from the main memory 11 to the special memory 13 of the accelerator.

As is evident from the communication sequence between at least two accelerators in a computer cluster as described with reference to FIG. 1, the communication between the accelerators 14 and 24 shown here takes place indirectly via the CPUs 12, 22 of the computers 10, 20 with corresponding access to the respective main memories 11, 21. Accordingly, usability of accelerators in a computer cluster is possible only to a limited extent owing to lack of direct communication and/or synchronization possibilities between (remote) accelerators. In particular, an increase in performance and/or efficiency (with regard to time and/or memory space requirement) can be achieved only to a limited extent as a result of such a communication overhead between the accelerators. Accordingly, parallelization of the computers in a computer cluster for increasing performance, memory expansion and/or improved error tolerance is also not possible or only possible to a limited extent.

Accordingly, it may be desirable to achieve an increase in the performance of accelerators in a computer cluster, to increase an amount of special memory for accelerators and/or to increase an error tolerance.

In principle, an increase in the performance of accelerators in a computer cluster can be achieved by means of closely coupled parallelization. However, in the case of communication-intensive problems which are processed in a cluster, an increase in performance by parallelization may essentially be limited by a high communication overhead which can arise as a result of the communication-intensive problems. A communication-intensive problem can relate to applications and/or algorithms which expend a significant portion of the computing time on communication instead of calculations.

Clusters having a low communication overhead, that is to say if no or only a few communication-intensive problems are processed in the cluster, are also designated as closely coupled systems or clusters. Closely coupled clusters are contrasted with loosely coupled systems or clusters. Loosely coupled systems have a substantially high communication overhead. With an increasing degree of parallelization, such a communication overhead from a specific point on can exceed a gain in performance as a result of a computing power of the computer in the cluster, since the computers in the cluster are no longer utilized to full capacity. From this point on, the total performance of the cluster can then decrease.

Furthermore, it is possible to increase the amount of special memory by aggregation and/or to increase the error tolerance in a computer cluster by parallelization. Special memories 13, 23 of accelerators 14, 24 normally comprise a much lower capacity than main memories 11, 21 of CPUs 12, 22. Accordingly, special memories may constitute a scarce resource in a computer 10, 20 and thus a scarce resource in a computer cluster. If many accelerators 14, 24 are used in a computer cluster, then a total available amount of special memory can be increased by aggregation, assuming that partitioning of the problem is possible. A problem, for example an application and/or a program which is executed in the cluster, can be partitioned if, after the partitioning, the individual partitions processes at least one element of the data to be processed (e.g. an element of an array, of a vector, and/or of a list) alone, undertakes a functional part of the processing of the data alone (e.g. pipelining) and/or performs one of the two aspects above redundantly for reasons of error tolerance.

Error tolerance can describe the ability of a cluster to make it possible to ensure correct execution of a calculation in a finite time despite the occurrence of individual errors. In this case, there is, in all parts of the computer cluster, such as, for example, a failure of individual computers (or parts thereof) in the cluster, a failure of network connections of the cluster and/or a failure of network switches in the cluster. In the case of extremely parallel clusters, however, a probability of an error-governed failure of individual computers in the cluster can increase as a result. In order to counteract such an error-governed failure, attempts can be made to tolerate individual failures by means of redundancy (i.e. partial tasks are processed by a plurality of computers). Even if there is only one individual accelerator 14, 24 in a cluster, the possibility of a failure exists, in which case error tolerance can be achieved by replication.

In particular, the abovementioned advantages and/or improvements can be achieved by the provision of an extension of an address space, which extension is transparent for an accelerator. In this case, transparent can also mean that an accelerator does not see any difference between a local main memory access and an access to remote memories in another computer in the computer cluster. The term address space denotes a set of addresses which can each be addressed uniformly and (within the address space) uniquely. In a computer, the main memory is managed and addressed with the aid of addresses. An available address space can relate either to available addresses which are defined by the magnitude of a physical address, and/or relate to valid addresses which point to available resources. Resources are available if they are present and are configured for a correct functionality. If an address space is extended transparently, then no difference between addresses is visible and/or discernible to resources before and after the extension.

A transparent extension can be present, in particular, if global addresses can be used without a difference with respect to local addresses. In particular, there is no need for any special operations (configuration or the like) before and/or after the actual access to a global address in comparison with a local access.

A non-transparent extension can be present, in particular, if addresses of the extension have to be addressed and/or used differently than other addresses. Thus, an accelerator in a cluster, in the transparently extended address space by means of addresses, can then directly access remote data stored in another computer in the computer cluster.

Figure 2:
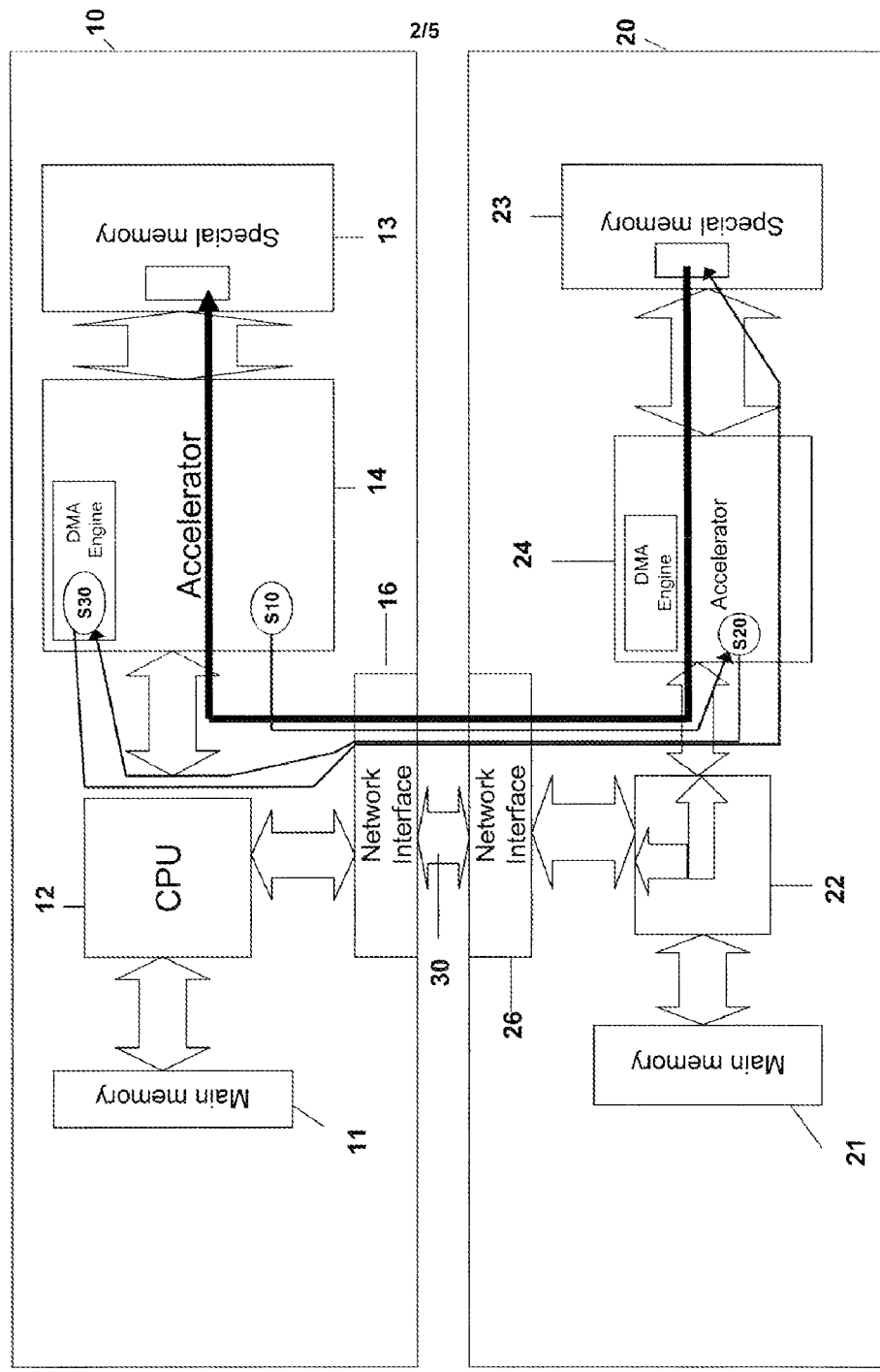
FIG. 2 shows a method according to the invention for direct communication between hardware accelerators in a computer cluster.

FIG. 2 shows direct communication between accelerators in a computer cluster. A computer cluster can comprise a multiplicity of computers (also called nodes or servers). FIG. 2 shows a computer cluster comprising two computers 10, 20. The computers 10, 20 of the computer cluster shown corresponds to the computers 10, 20 shown in FIG. 1 and correspondingly have the components 11, 12, 13, 14, 16 and 21, 22, 23, 24, 26 with the corresponding functionalities as described above with FIG. 1.

Unlike in FIG. 1, communication between the accelerators 14 and 24 takes place directly in the computer cluster shown in FIG. 2. Accordingly, the accelerators 14, 24 can exchange messages, interrogate data and/or exchange data directly with one another. In this case, direct communication means that no further components which support the communication between the accelerators 14, 24 (such as, for example, a CPU 12, 22 and/or a main memory 11, 21) are required for a communication operation with message and/or data exchange between the accelerators 14, 24. Furthermore, no copying operations (for example to the main memories 11, 21 of the computers 10, 20) of requested and/or exchanged data are required.

FIG. 2 shows more efficient and optimized communication between remote accelerators 14, 24 in different computers 10, 20 in a computer cluster. In particular, unlike the communication shown with reference to FIG. 1, neither the CPUs 12, 22 nor the main memories 11, 21 of the computers 10, 20 are required. Moreover, no operations of copying exchanged data to the main memories 11, 21 are performed. Consequently, the communication between the accelerators 14, 24 of the remote computers 10, 20 can take place more efficiently, wherein not only less time but also less memory space is required.

FIG. 2 shows an exemplary implementation of direct communication between accelerators 14, 24 in a computer cluster. In this regard, in particular step S10 and/or step S20 are/is optional. Furthermore, step S30 constitutes pull-type communication, which can also be replaced by push-type communication. In this regard, in particular, the communication can be reduced to the arrow highlighted in bold or in a broad manner in FIG. 2.

In step S10, the accelerator 14 of a first computer 10 in the computer cluster requests data from an accelerator 24 of another computer 20, that is to say a remote accelerator 24. The remote accelerator 24 ensures that the requested data are present and accessible, and confirms the reception of the message or request from the accelerator 14, S20. If the accelerator 14 has received the confirmation from the remote accelerator 24, the accelerator 14 uses a direct memory access to global addresses in order to fetch the requested data, S30. An implementation of a direct memory access to global addresses in a global address space of the network 30 is described below with reference to FIGS. 3 and 4. The data are then transferred in a corresponding response. A data transfer can take place in both directions. By way of example, an accelerator 14 can retrieve data from a remote accelerator 24 and/or send data to the remote accelerator 24. For both operations it may be necessary for resources to be prepared on the remote accelerator 24. In the case of the sending operation, this can concern the operation of reserving memory space, for example. In the case of the retrieving operation, this may concern the provision of the data. Both during the retrieval of data from the remote accelerator 24 and during the sending of data from the remote accelerator to the (local) accelerator 14, the remote accelerator 24 firstly ensures with a confirmation that the data transfer per se can then take place, before the data are transmitted. After the (local) accelerator has received this confirmation, a direct memory access to global addresses is used to carry out the data transfer.

A global address relates to the global address space. In systems with distributed shared memory, a global address contains a coding of the destination computer for pathfinding to this computer and the desired data stored there. An implementation of such a global address in a global address space of the network 30 for pathfinding is described below with reference to FIGS. 3 and 4. A transparent extension of an address space has the consequence that, from the point of view of the accelerator, there are no differences when accessing local and global addresses. Consequently, the accelerator is able to access global addresses without restrictions.

Accordingly, each of the accelerators 14, 24 in the computer cluster can autonomously access data in main memories 11, 21 and/or in special memories 13, 23 in the own and/or in other, remote computers 10, 20 in the computer cluster for communication of messages and/or data and/or for synchronization of data between remote computers 10, 20. An accelerator 14, 24 can execute an operation autonomously if support of other and/or superordinate units, in particular computing and/or memory units, such as a CPU 12, 22 and/or a main memory 11, 21, for example, is not required for this purpose. Only units directly required for communication between accelerators 14, 24, such as the network 30 and/or the network interface 16, 26, for example, are employed and/or used in direct communication between autonomous accelerators 14, 24.

In this case, for the accelerator 14, 24 and/or for a component for direct memory access, an access to remote memories (main memories 11, 21 and/or special memories 13, 23) is indistinguishable from a local access to the local main memory 11, 21. Accordingly, it is also not necessary to adapt an accelerator architecture to the direct communication between accelerators 14, 24 of different computers 10, 20 in a computer cluster. Since such a remote memory access is carried out by means of global addresses and these global addresses are integrated into the respective local address space transparently for the accelerators 14, 24, no difference between local and global (in particular remote) addresses can be ascertained for the accelerator 14, 24.

As described with reference to FIG. 2, direct communication between accelerators 14, 24 in a computer cluster is based on remote writing and/or reading operations. The remote writing and/or reading operations substantially serve for requesting and/or for exchanging data between the accelerators 14, 24. The remote writing and/or reading operations from a source accelerator 14, 24 to a destination accelerator 14, 24 in the computer cluster are implemented via the network 30 by means of a direct memory access to the global address space of the network 30, such that direct communication between the accelerators 14, 24 is made possible. For this purpose, essentially only the network interfaces 16, 26 of the respective computers 10, 20 involved are modified.

A remote writing operation is a writing operation of a source computer 10, 20 which is forwarded through the corresponding network interface 16, 26 to a destination computer 10, 20 via the network 30. Depending on the address, an arbitrary memory unit (also designated as memory) 11, 13, 21, 23 on the destination computer 10, 20 can be addressed, in particular including a special memory 13, 23. A remote reading operation is executed in a corresponding manner, a response being sent back to the source computer 10, 20, which requested the reading operation, with the data read.

As described with reference to FIG. 2, direct communication between accelerators 14, 24 in a computer cluster can comprise one, a plurality or all of the following method steps:

1. A source accelerator (e.g. 14) starts with a writing operation to a previously known global address in the global address space of the network 30 of the computer cluster. Data are available either in the accelerator 14 and/or in the special memory 13 assigned to the accelerator 14.
2. A source network interface (e.g. 16) receives the write request in the global address space, identifies the addressed destination computer (e.g. 20) in the network 30 of the cluster and forwards the request with the data via the network 30.
3. A corresponding destination network interface (e.g. 26) receives the request, extracts destination address and data from the global address of the global address space and writes them to a corresponding destination address in the global address space. This destination address can point to a special memory (e.g. special memory 23 of the destination accelerator 24). In this case, the request is forwarded directly to the special memory 23 of the destination accelerator 24. Other memory units (such as main memory 21, for example) of the destination computer 20 can also be addressed.
4. If the destination accelerator 24 is already waiting for the data, it can poll well-known addresses in its special memory 23, which are changed by the source accelerator 14 after the data transmission.

Steps 1-3 specify a remote writing operation which is a simple form of a communication method (also designated as eager push-type communication). Furthermore, such a communication method can be used to form more complex communication methods, such as a rendezvous communication, for example.

The remote writing operation in a computer cluster to a global address in the global address space of the network 30 in step 1 can be replaced by a reading operation at a global address in the global address space of the network 30. Such a remote reading operation is also designated as an eager pull-type communication. This remote reading operation substantially corresponds to the remote writing operation described above, wherein a request of a source accelerator (e.g. 14) no data and the destination or the destination accelerator (e.g. 24), in particular the special memory (e.g. 23) on the destination computer, e.g. 20, responds to the request with a response packet containing the data. Since such so-called split-phase protocols separate requests and responses, a tag can be used in order to enable an assignment of responses to requests again at a later point in time. For this purpose, corresponding structures are managed by the network interface (e.g. 26) of the destination computer (e.g. 20) in order to store the original source computer (e.g. 10) for each incoming request. If a response from the destination special memory (e.g. 23) returns later, said response is then forwarded to the to the corresponding source computer (e.g. 10), in particular the source accelerator 24.

In split-phase protocols, tags are used for matching responses with requests. In connection with global address spaces, requests from different source accelerators 14, 24 and therefore different tag domains can address an individual destination accelerator 14, 24. In this case, collisions of tags are possible and have to be ruled out for correct execution. Arriving tags are therefore translated into a new, locally unique, tag. The original tag is stored together with other information such as source identification in a table. If a network interface 16, 26 receives a response from the memory controller at a later point in time, the tag of the response is compared with all valid entries in the table, and the original tag and the source identification are thus determined. These are used for returning the response via the network.

Eager pull-type and eager push-type communication are also designated hereinafter in summary as eager communication for writing/reading operations between remote accelerators 14, 24 in a computer cluster.

The remote writing operation in a computer cluster in direct communication between accelerators 14, 24 can be designated as a form of so-called eager communication. Such communication is "eager" in the sense that no negotiation regarding when and where to/where from communication takes place is carried out during the communication between the accelerators 14, 24. Source buffer and destination buffer have already been negotiated beforehand and the data transmission can thus begin immediately. Source buffer and destination buffer are identified with the aid of global addresses in the global address space of the network 30. For eager communication, corresponding buffers are established before the communication (or when logical connections are set up) in the global address space and the established addresses are correspondingly exchanged with the accelerators 14, 24 involved or the corresponding special memories 13, 23 thereof. For example, eager communication may be suitable for short data transmissions, for example in the case of amounts of data of between 4 bytes and 128 kbytes, which can easily be accommodated in a prereserved buffer.

In contrast to eager communication, so-called rendezvous communications begins with a request to transmit data. This request is forwarded from the source (for example accelerator 14) to the destination (for example accelerator 24). After receiving this request, the destination reserves a suitable amount of buffer (e.g. a memory area in the assigned special memory 23 of the destination accelerator 24) and sends a confirmation back to the source accelerator 14. The source accelerator 14 indicates that a data transmission can then begin. Rendezvous protocols can be realized in various ways, wherein the protocols can be based on reading and/or writing operations. Examples of an implementation of such rendezvous protocols are presented in the table below and comprise for example a use of push-type for a rendezvous message (start of the rendezvous) and pull-type for the actual data transfer between the accelerators 14, 24 involved.

Rendezvous communication between accelerators 14, 24 in a computer cluster can begin with eager communication in order to send a request from a source accelerator 14 to a destination accelerator 24. The request comprises a rendezvous communication request being written by the source accelerator 14 to a known address in the special memory 23 of the destination accelerator 24. The destination accelerator 24 receives this request and ensures that enough buffer or memory space is available in its special memory 23. The destination accelerator writes a corresponding confirmation to a known address of the special memory 13 of the source accelerator 14 and/or starts to fetch corresponding data by means of remote reading operations directly from the special memory 13 of the source accelerator 14.

If a confirmation concerning the request is written to the known address of the special memory 13 of the source accelerator 14, then the confirmation comprises a corresponding destination address in the special memory 23 of the destination accelerator 23, such that the source accelerator 14 can autonomously write the data of the writing operation carried out at this destination address.

If corresponding data are fetched by means of remote reading operations directly from the special memory 13 of the source accelerator 14, the first request of the source accelerator 23 contains a corresponding source address in the special memory 13 of the source accelerator 14.

Notification of operations that have ended can be realized by polling memory addresses. Such memory addresses should preferably be located in the special memory 13, 23 of the corresponding accelerators 14, 24. The memory addresses can be exchanged before communication (e.g. when logical connections are set up) between the accelerators 14, 24, preferably in combination with a constant update after each communication between the accelerators 14, 24 (also designated as consecutive addresses in the ring buffer) and/or as parameters upon initialization of communication (e.g. rendezvous message) between the accelerators 14, 24. These memory addresses can either be dedicated, but can also be part of the transmitted data. In the latter case, it must be ensured that this part of the data is also changed by the communication.

The following table describes exemplary communication methods for implementing direct communication between hardware accelerators 14 and 24 in a computer cluster, such as in the cluster shown in FIG. 2, together:

| Communication method | Initialization | Data transfer | Notification of ending |
|---|---|---|---|
| Eager push-type | Previously known destination address, e.g. as dedicated ring buffer (one per source) on destination side | Remote writing operations, initiated by source node | Remote writing to known address or by polling for value change (part of the payload data) |
| Rendezvous push-type | Use of eager push-type for exchanging communication information. A request is sent from the source to the destination, which then responds with a confirmation. The request contains the magnitude of the payload data, and the confirmation contains the destination address. | | |
| Eager pull-type | Previously known source address, e.g. a dedicated ring buffer for each destination on the source side. Possibly polling of source addresses for notification of new data. | Remote reading, initiated by target node | Use of eager push-type for notification |
| Rendezvous pull-type | Use of eager push-type for exchanging communication information. Request is sent from the destination to the source and includes either a tag or the address of the requested data. Source responds with confirmation, possibly including source address. | | |

Implementations can exchange basic communication types described above as part of a more complex communication method by other basic communication types. By way of example, as part of the rendezvous communication, eager push-type can be replaced by eager pull-type, assuming that a corresponding exchange of communication information with regard to the source and/or destination addresses has taken place beforehand.

An implementation of one or more of the above-described communication methods for direct communication between accelerators 14, 24 in a computer cluster merely requires a corresponding modification of the network interfaces 16, 26 of the computers 10, 20 in the computer cluster. The accelerators 14, 24 are not modified and so any commercially available accelerator 14, 24 can be used in the direct communication. The network interfaces 16, 26 can implement corresponding support completely transparently, such that differences between access to local and/or remote memory units are not discernible to the accelerators.

For an improved error tolerance, outstanding requests can be monitored. In the case of such requests being lost, corresponding errors can be reported back to the requesting unit (CPU 12, 22 and/or accelerators 14, 24). Otherwise, this unit might wait for the response permanently in a blocking manner. For this purpose, the network interface 16, 26 implements a table with an entry for each tag. A counter is allocated to each entry, which counter starts to count as soon as a request with a corresponding tag is sent. After the counter has run, an error response is generated and returned to the requesting unit. If in this case the associated response from the network 30 does actually arrive, it is discarded. Together with the error response, other actions can also be initiated, such as interrupts and/or the setting of error bits in the status register.

For complete support of consistency models, the network interface 16, 26 can monitor outstanding remote writing operations and ascertain when the associated changes become visible. In general, a writing operation becomes visible as soon as the addressed memory areas have been updated. Since remote writing operations here can experience different delays, no assumptions can be made about the point in time without notification. Since writing operations are usually executed as "posted requests", however, no responses are generated and the point in time of execution is therefore not known. The network interface 16, 26 can therefore optionally translate posted requests into non-posted requests. The destination will then automatically generate a response after the execution of a non-posted writing operation. A counter in the source network device is automatically incremented for each such outgoing non-posted operation, and decremented for each arriving corresponding response. If this counter is zero, it is ensured that there are no open outstanding writing operations and a synchronization point has been reached. It should be taken into consideration the responding to translated non-posted requests are not forwarded, but rather discarded after the counter has been decremented.

Figure 3:
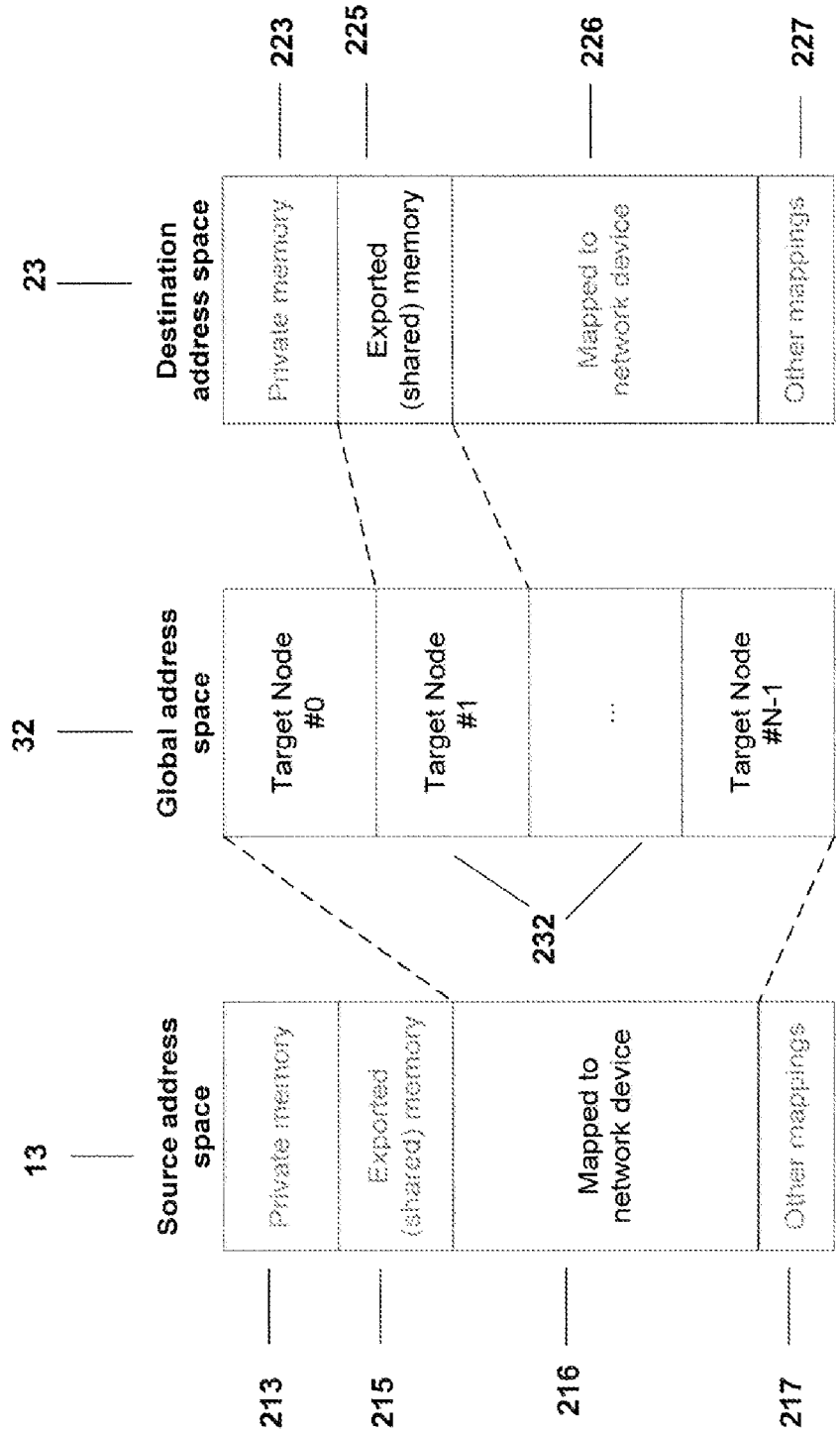
FIG. 3 shows an exemplary direct memory access to a global address space for direct communication between hardware accelerators in a computer cluster.

FIG. 3 shows exemplary address spaces for an implementation of direct communication methods for direct communication between accelerators 14, 24 in a computer cluster by means of a direct memory access to a global address space 32 of the network 30 of the computer cluster.

Local accesses from an accelerator 14, 24 to a network interface 16, 26 are actually only locally valid. An accelerator 14, 24 can comprise in its special memory 13, 23 an address space 216, 226 for the corresponding network interface 16, 26. Such a network interface address space is also designated as source address space or global source address 216, 226 in communication between source and destination computers 10, 20.

A special memory 13, 23 and/or any other memory of a computer 10, 20 can comprise one or more address spaces. By way of example, the memory 13, 23 comprises a private or local address space 213, 223, a distributed address space 215, 225 for remote communication, a network interface address space 216, 226, and/or a further address space 217, 227.

From outside an accelerator 14, 24, the access to the special memory 13, 23 can be restricted, usually in order to save address space. In this case, there exists in the accelerator 14, 24 a register set which defines an aperture (e.g. 215, 225) which makes part of the special memory 13, 23 accessible externally. Said aperture can be defined, inter alia, by start and end addresses. Before an access to an area of the special memory 13, 23 outside the current aperture, the aperture must be redefined in order to contain precisely this requested area.

The CPU 12, 22 can control the aperture by means of reading and/or writing operations. In a similar manner, remote CPUs 12, 22 and/or accelerators 14, 24 can also control the aperture by means of remote reading and/or writing. For an individual remote memory unit, this is possible without problems; if a plurality of remote memory units compete for a local aperture, corresponding protocols must ensure that at each point in time there is only one remote user of said local aperture and/or that a local aperture setting satisfies the wishes of a plurality of remote users.

During direct communication, in particular a writing and/or reading operation, between accelerators 14, 24 in a computer cluster, a direct memory access to the global address space 32 of the network 30 of the computer cluster is executed. By way of example, if accelerator 14 is the source accelerator 14 and accelerator 24 is the destination accelerator 24, then a source address 216 in the special memory 13 of the source accelerator 14 is translated into a global address 232 in the global address space 32 of the network 30. By way of example, the source accelerator 14 accesses a physical address in an address space 216 of its special memory 13 that is provided for network communication, such that a corresponding request can be forwarded to the network interface 16 of the source computer 10. Via the network interface 16, said address 216 of the request is translated into a global address 232 in the global address space 32, preferably by subtraction of the start address (offset) of this address region 216.

The global address 232 in the global address space 32 can be used for identifying the destination computer 20 and thus the destination accelerator 24. The global address 232 in the global address space 32 of the network 30 is translated into a corresponding destination address 225 in the special memory 23 of the destination accelerator 24. In other words, the destination accelerator 24 is determined on the basis of this global address 232 in the global address space 32.

A determination of the destination accelerator 24 with the aid of the global address 232 can be determined by one and/or a plurality of the methods described below. One preferred implementation of this destination determination is a mask, described with reference to FIG. 4. If the destination accelerator 24 has been determined, the request is forwarded via the network 30 to the destination accelerator 24. At the destination accelerator 24, the global address 232 of the global address space 32 is translated into a corresponding destination address 225 in the special memory 23 of the destination accelerator 24 by the addition of the offset of the exported memory region (e.g. special memory). This address is used as the physical destination address 225, and the request is thus forwarded to a local memory controller of the special memory 23 of the destination accelerator 24.

Figure 4:
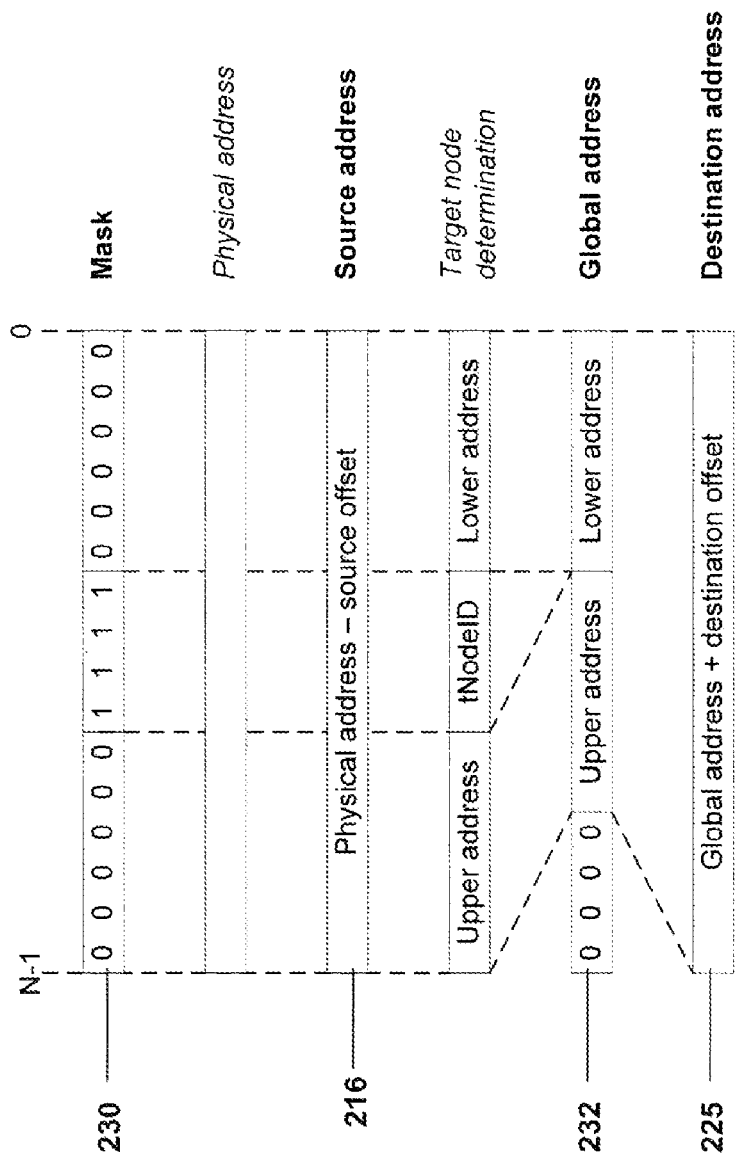
FIG. 4 shows an exemplary implementation of a mask-based identification of a target node or computer in a computer cluster for a direct memory access to a global address space.

FIG. 4 shows a mask-based identification of a destination accelerator (e.g. 24) for implementing a direct memory access to a global address space 32 (cf. FIG. 3) during direct communication between accelerators 14, 24 in a computer cluster.

By means of a mask 230, part of the global source address 216 received by the source accelerator 14 is defined, which define the destination accelerator identification (tNodeID) as a bit combination. As shown in FIG. 4, irrelevant bits of the global source address 216 are masked out by the mask 230, and the relevant bits are converted into a global address 232 for destination identification. A logical AND operation can be used for combining the mask 230 with the global source address 216. For a non-consecutive region of is in the mask 230, the corresponding segments are also compacted before the bit region can be used as destination identification. For the global address 232, the bits previously masked out are selected and made consecutive by compaction.

A mask 230 partitions the global address space 32 into a plurality of partitions, one for each potential destination accelerator 14, 24 in the cluster. Their number corresponds to the number of is in the mask 230 raised to the power of 2. Furthermore, each partition has the same size.

In the case of an interval-based destination identification for implementing a direct memory access to the global address space 32, a set of intervals is used, wherein each interval consists of a start address, a length and a destination identification. The source address is compared with each interval (start address and length). If an interval is hit (start<=address<=start+length), the associated destination identification is used. The length of an interval can optionally be replaced with an end address. If more than one interval is hit on account of overlaps, then a priority scheme is used for a unique destination identification. If no interval is hit, a mask-based approach can be used to determine a valid destination accelerator 14, 24.

Intervals offer more flexibility than a mask 230. The number of possible destination accelerators 14, 24 need not be a power of 2, and the size of the individual partitions can vary. However, the number of destination accelerators 14, 24 is limited by the number of intervals.

Figure 5:
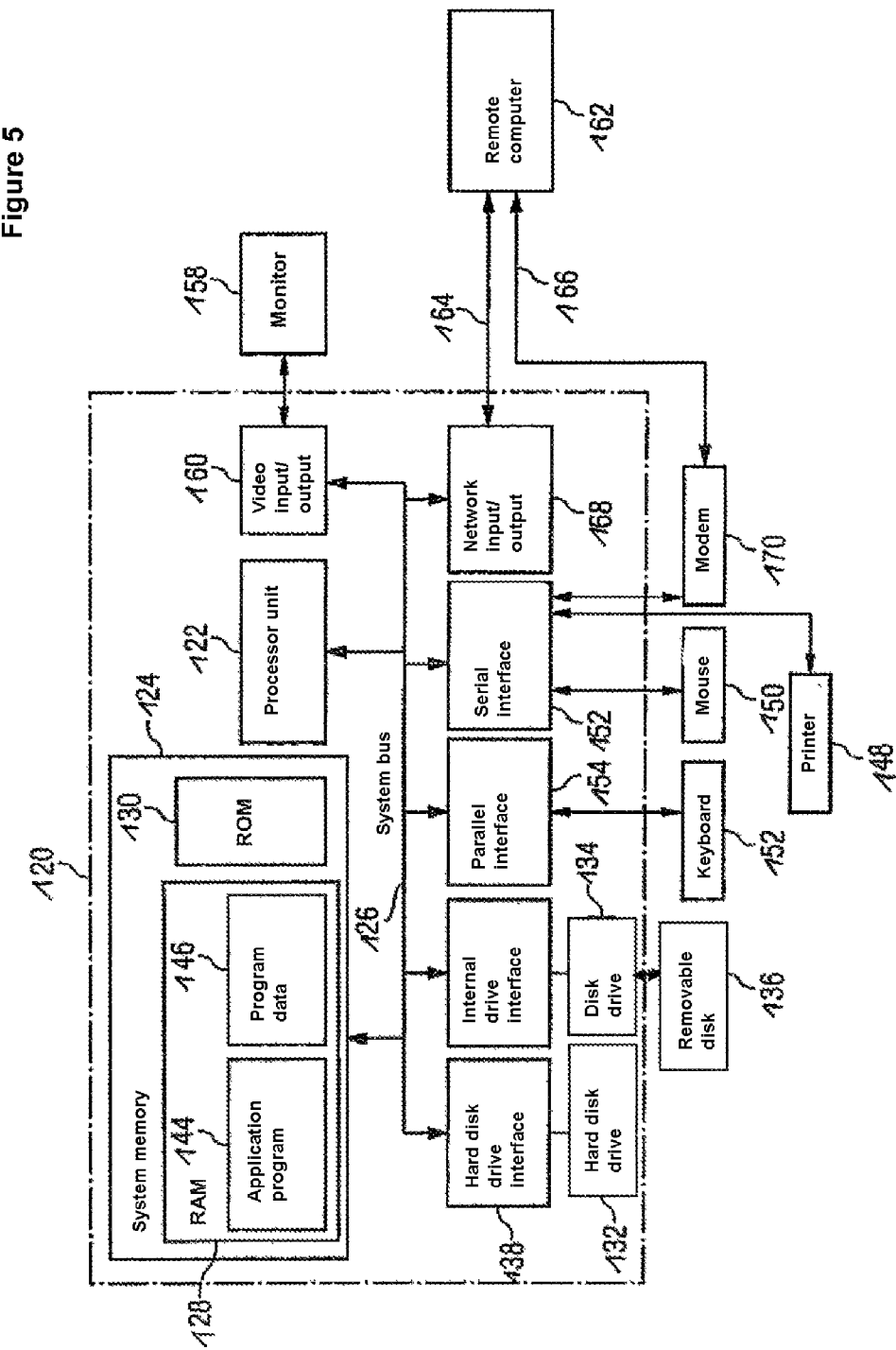
FIG. 5 shows a computer network for implementing a system for direct communication between hardware accelerators in a computer cluster.

An exemplary system for implementing the invention is described with reference to FIG. 5. An exemplary system comprises a universal computer device in the form of a conventional computer environment 120, e.g. a personal computer (PC) 120, comprising a processor unit 122, a system memory 124 and a system bus 126, which connects a multiplicity of system components, inter alia the system memory 124 and the processor unit 122. The processor unit 122 can carry out arithmetic, logical and/or control operations by accessing the system memory 124. The system memory 124 can store information and/or instructions for use in combination with the processor unit 122. The system memory 124 can comprise volatile and nonvolatile memory, for example random access memory (RAM) 128 and read-only memory (ROM) 130. A basic input-output system (BIOS) containing the basic routines which help to transfer information between the elements within the PC 120, for example during start-up, can be stored in the ROM 130. The system bus 126 can be one of many bus structures, inter alia a memory bus or a memory controller, a peripheral bus and a local bus, which uses a specific bus architecture from a multiplicity of bus architectures.

The PC 120 can furthermore comprise a hard disk drive 132 for reading from or writing to a hard disk (not shown) and an external disk drive 134 for reading from or writing to a removable disk 136 or a removable data carrier. The removable disk can be a magnetic disk or a magnetic floppy disk for a magnetic disk drive or floppy disk drive or an optical disk such as e.g. a CD-ROM for an optical disk drive. The hard disk drive 132 and the external disk drive 134 are in each case connected to the system bus 126 via a hard disk drive interface 138 and an external disk drive interface 140. The drives and the assigned computer-readable media make available a nonvolatile memory of computer-readable instructions, data structures, program modules and other data for the PC 120. The data structures can comprise the relevant data for implementing a method as described above. Although the environment described by way of example uses a hard disk (not shown) and an external disk 142, it is obvious to the person skilled in the art that other types of computer-readable media which can store computer-accessible data can be used in an exemplary operating environment, such as e.g. magnetic cassettes, flash memory cards, digital video disks, random access memories, read-only memories, etc.

A multiplicity of program modules, in particular an operating system (not shown), one or more application programs 144 or program modules (not shown) and program data 146 can be stored on the hard disk, the external disk 142, the ROM 130 or the RAM 128. The application programs can comprise at least part of the functionality as shown in FIG. 2.

A user can input commands and information, as described above, into the PC 120 with the aid of input devices, such as e.g. a keyboard 148 and a computer mouse or a trackball 150. Other input devices (not shown) can comprise a microphone and/or other sensors, a joystick, a gamepad, a scanner or the like. These or other input devices can be connected to the processor unit 122 with the aid of a serial interface 152 coupled to the system 126, or can be connected with the aid of other interfaces, such as e.g. a parallel interface 154, a game port or a universal serial bus (USB). Furthermore, information can be printed by means of a printer 156. The printer 156 and other parallel input/output devices can be connected to the processor unit 122 by means of the parallel interface 154. A monitor 158 or other types of display device(s) is/are connected to the system bus 126 by means of an interface, such as e.g. a video input/output 160. In addition to the monitor, the computer environment 120 can comprise other peripheral output devices (not shown) such as e.g. loudspeakers or acoustic outputs.

The computer environment 120 can communicate with other electronic devices, e.g. a computer, a corded telephone, a cordless telephone, a personal digital assistant (PDA), a television or the like. In order to communicate, the computer environment 120 can operate in a networked environment, wherein connections to one or more electronic devices are used. FIG. 5 illustrates the computer environment networked with a remote computer 162. The remote computer 162 can be another computer environment, such as e.g. a server, a router, a network PC, a peer device, or other customary network nodes, and can comprise many or all of the elements described above with regard to the computer environment 120. The logical connections such as are illustrated in FIG. 5 comprise a local area network (LAN) 164 and a wide area network (WAN) 166. Such network environments are conventional in offices, company-wide computer networks, intranets and the Internet.

If a computer environment 120 is used in a LAN network environment, the computer environment 120 can be connected to the LAN 164 by a network input/output 168. If the computer environment 120 is used in a WAN network environment, the computer environment 120 can comprise a modem 170 or other means for establishing communication via the WAN 166. The modem 170, which can be internal and external with respect to the computer environment 120, is connected to the system bus 126 by means of the serial interface 152. In the network environment it is possible to store program modules represented relative to the computer environment 120 or sections thereof in a remote memory device, which are system-inherent or accessible at or by a remote computer 162. Furthermore, other data which are relevant to the method or system described above can be present in a manner accessible on or by the remote computer 162.

LIST OF REFERENCE SIGNS

10, 20 Computer
11, 21 Main memory or primary memory 12, 22 CPU or (primary processor)
13, 23 Special memory
14, 24 (Hardware) accelerator
16, 26 Network interface
30 Network
32 Global address space
213, 223 Local address space or local address
215, 225 Distributed address space or distributed address
216, 226 Network interface address space or network interface address
217, 227 Further address space or further address
230 Mask
232 Global address
S1-S8 Indirect communication between accelerators
S10, S20, S30 Direct communication between accelerators
120 Computer environment
122 Processor unit
124 System memory
126 System bus
128 Random access memory (RAM)
130 Read-only memory (ROM)
132 Hard disk drive
134 Disk drive
136 Removable disk
138 Hard disk drive interface
140 Disk drive interface
142 External disk
144 Application program
146 Program data
148 Keyboard
150 Computer mouse/trackball
152 Serial interface
154 Parallel interface
156 Printer
158 Monitor
160 Video input/output
162 Remote computer
164 Local area network (LAN)
166 Wide area network (WAN)
168 Network input/output
170 Modem

The invention claimed is:

1. A system for direct communication between hardware accelerators in a computer cluster, comprising:
a first hardware accelerator in a first computer of a computer cluster; and
a second hardware accelerator in a second computer of the computer cluster;
wherein the first computer and the second computer differ from one another and are designed to be able to communicate remotely via a network, and
wherein the first accelerator is designed to request data from the second accelerator and to retrieve data by means of a direct memory access to a global address space on the second computer and to communicate data to the second computer,
wherein the direct communication between the hardware accelerators of the first and second computers occurs without support of computing units and without support of memory units.

2. The system of claim 1, wherein the direct communication between the hardware accelerators takes place directly via the network and corresponding network interfaces on the computers in the cluster.

3. The system of claim 1, wherein the computing units include of the first and second computers and wherein the memory units include main memories of the first and second computers.

4. The system of claim 1, wherein the global address space is transparent, such that the accelerators see no difference between a local memory access and an access to a remote memory in one of the computers of the computer cluster.

5. The system of claim 1, wherein the global address space is a partition in a distributed shared memory of the computer cluster.

6. The system of claim 5, wherein the partition is a shared partition in the distributed shared memory of the computer cluster.

7. The system of claim 1, wherein retrieving data by means of the direct memory access to the global address space includes translating a source address in the special memory of the first accelerator into a global address in the global address space, wherein the second accelerator is determined by means of the global address in the global address space.

8. The system of claim 7, wherein the second accelerator is determined by means of a mask in the global address space.

9. The system of claim 7, wherein the second accelerator is determined by means of intervals in the global address space.

10. The system of claim 1, wherein the direct communication between the hardware accelerators occurs without support of CPUs of the first and second computers and without support of main memories of the first and second computers.

11. The system of claim 1, wherein the global address space includes a partition in a distributed shared memory of the computer cluster, wherein the partition is transparent, such that the accelerators see no difference between a local memory access and an access to the partition.

12. The system of claim 1,
wherein the direct communication between the hardware accelerators occurs without support of CPUs of the first and second computers and without support of main memories of the first and second computers, and
wherein the global address space includes a partition in a distributed shared memory of the computer cluster, wherein the partition is transparent, such that the accelerators see no difference between a local memory access and an access to the partition.

13. The system of claim 1,
wherein the direct communication between the hardware accelerators occurs without support of CPUs of the first and second computers and without support of main memories of the first and second computers,
wherein the global address space includes a partition in a distributed shared memory of the computer cluster, wherein the partition is transparent, such that the accelerators see no difference between a local memory access and an access to the partition, and
wherein retrieving data by means of the direct memory access to the global address space includes translating a source address in the special memory of the first accelerator into a global address in the global address space, wherein the second accelerator is determined by means of the global address in the global address space.

14. The system of claim 1,
wherein the direct communication between the hardware accelerators occurs without support of CPUs of the first and second computers and without support of main memories of the first and second computers, wherein the global address space includes a partition in a distributed shared memory of the computer cluster, wherein the partition is transparent, such that the accelerators see no difference between a local memory access and an access to the partition, wherein retrieving data by means of the direct memory access to the global address space includes translating a source address in the special memory of the first accelerator into a global address in the global address space, wherein the second accelerator is determined by means of the global address in the global address space, and wherein the second accelerator is determined by means of a mask in the global address space.

15. The system of claim 1, wherein the direct communication between the hardware accelerators occurs without support of CPUs of the first and second computers and without support of main memories of the first and second computers, wherein the global address space includes a partition in a distributed shared memory of the computer cluster, wherein the partition is transparent, such that the accelerators see no difference between a local memory access and an access to the partition, wherein retrieving data by means of the direct memory access to the global address space includes translating a source address in the special memory of the first accelerator into a global address in the global address space, wherein the second accelerator is determined by means of the global address in the global address space, and wherein the second accelerator is determined by means of intervals in the global address space.

16. A method for direct communication between hardware accelerators in a computer cluster, the method comprising:

providing a first hardware accelerator in a first computer of a computer cluster; and providing a second hardware accelerator in a second computer of the computer cluster;

wherein the first computer and the second computer differ from one another and are designed to be able to communicate remotely via a network, and wherein the first accelerator is designed to request data from the second accelerator and to retrieve data by means of a direct memory access to a global address space on the second computer and wherein the first accelerator is designed to communicate data to the second computer, wherein the direct communication between the hardware accelerators of the first and second computers occurs without support of computing units and without support of memory units.

17. A computer program product stored on a computer-readable medium, which, when loaded into the memory of a computer and executed by the computer, causes the computer to:

provide a first hardware accelerator in a first computer of a computer cluster; and provide a second hardware accelerator in a second computer of the computer cluster;

wherein the first computer and the second computer differ from one another and are designed to be able to communicate remotely via a network, and wherein the first accelerator is designed to request data from the second accelerator and to retrieve data by means of a direct memory access to a global address space on the second computer and wherein the first accelerator is designed to communicate data to the second computer, wherein the direct communication between the hardware accelerators of the first and second computers occurs without support of computing units and without support of memory units.

* * * * *